(12) United States Patent
Murata

(10) Patent No.: US 6,219,086 B1
(45) Date of Patent: *Apr. 17, 2001

(54) TERMINAL APPARATUS

(75) Inventor: Makoto Murata, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/559,826

(22) Filed: Nov. 17, 1995

(30) Foreign Application Priority Data

Nov. 30, 1994 (JP) .................................................. 6-297638

(51) Int. Cl.⁷ ........................................................ H04N 7/18
(52) U.S. Cl. .................................. 348/13; 348/15; 348/16
(58) Field of Search ................................. 348/10, 15, 16, 348/13, 154

(56) References Cited

U.S. PATENT DOCUMENTS

| | | | | |
|---|---|---|---|---|
| 4,961,211 | * | 10/1990 | Tsugane | 379/54 |
| 5,347,306 | * | 9/1994 | Nitta | 348/16 |
| 5,479,203 | * | 12/1995 | Kawai et al. | 348/15 |
| 5,495,285 | * | 2/1996 | Fujioka | 348/15 |
| 5,585,839 | * | 12/1996 | Ishida | 348/15 |
| 5,638,114 | * | 6/1997 | Hatanaka et al. | 348/15 |
| 5,675,374 | * | 10/1997 | Kohda | 348/15 |
| 5,745,161 | * | 4/1998 | Ito | 348/15 |
| 5,850,250 | * | 12/1998 | Konopka | 348/15 |

* cited by examiner

Primary Examiner—Howard Britton
(74) Attorney, Agent, or Firm—Fitzpatrick, Cella, Harper & Scinto

(57) ABSTRACT

A terminal apparatus capable of holding a TV conference by communicating at least images and voices has a camera unit for taking a picture of participants in a TV conference to obtain video information, a plurality of audio input units for inputting audio information of each participant in the TV conference, and a control unit for controlling a zooming state of the camera unit according to an audio input condition of the plurality of audio input units. Another terminal apparatus has a video input unit for inputting video information, an audio input unit for inputting audio information related to the video information, and an audio transmission unit for transmitting the video information according to an audio input condition of the audio input unit. Another terminal apparatus has an audio input unit for inputting audio information, and an audio transmission unit for transmitting audio information to an external terminal according to an audio input condition of the audio input unit.

11 Claims, 17 Drawing Sheets

IMAGE OF ALL PARTICIPANTS

SATO
IMAGE CORRESPONDING
TO MICROPHONE 1

TANAKA
IMAGE CORRESPONDING
TO MICROPHONE 2

SUZUKI
IMAGE CORRESPONDING
TO MICROPHONE 3

MURATA
IMAGE CORRESPONDING
TO MICROPHONE 4

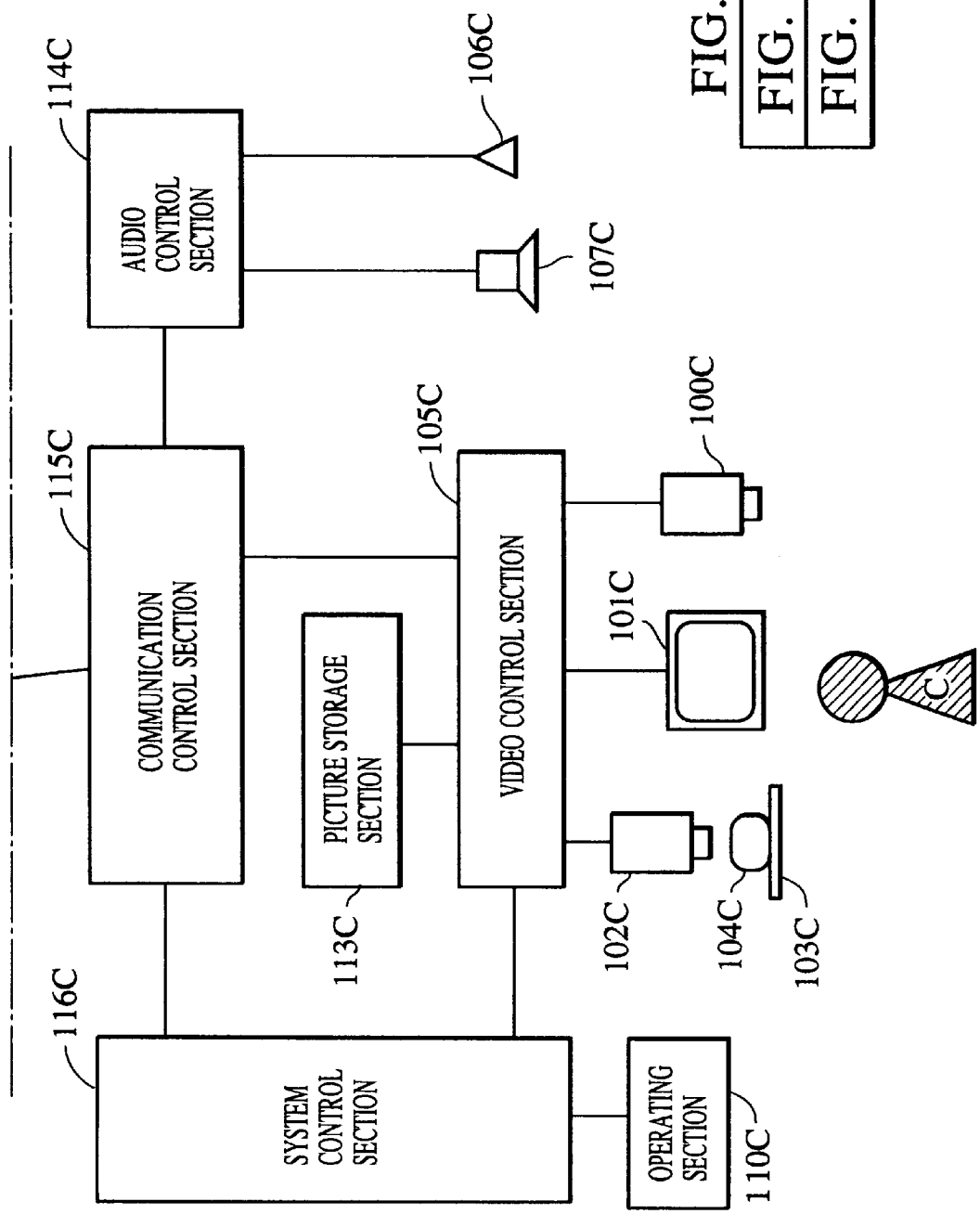

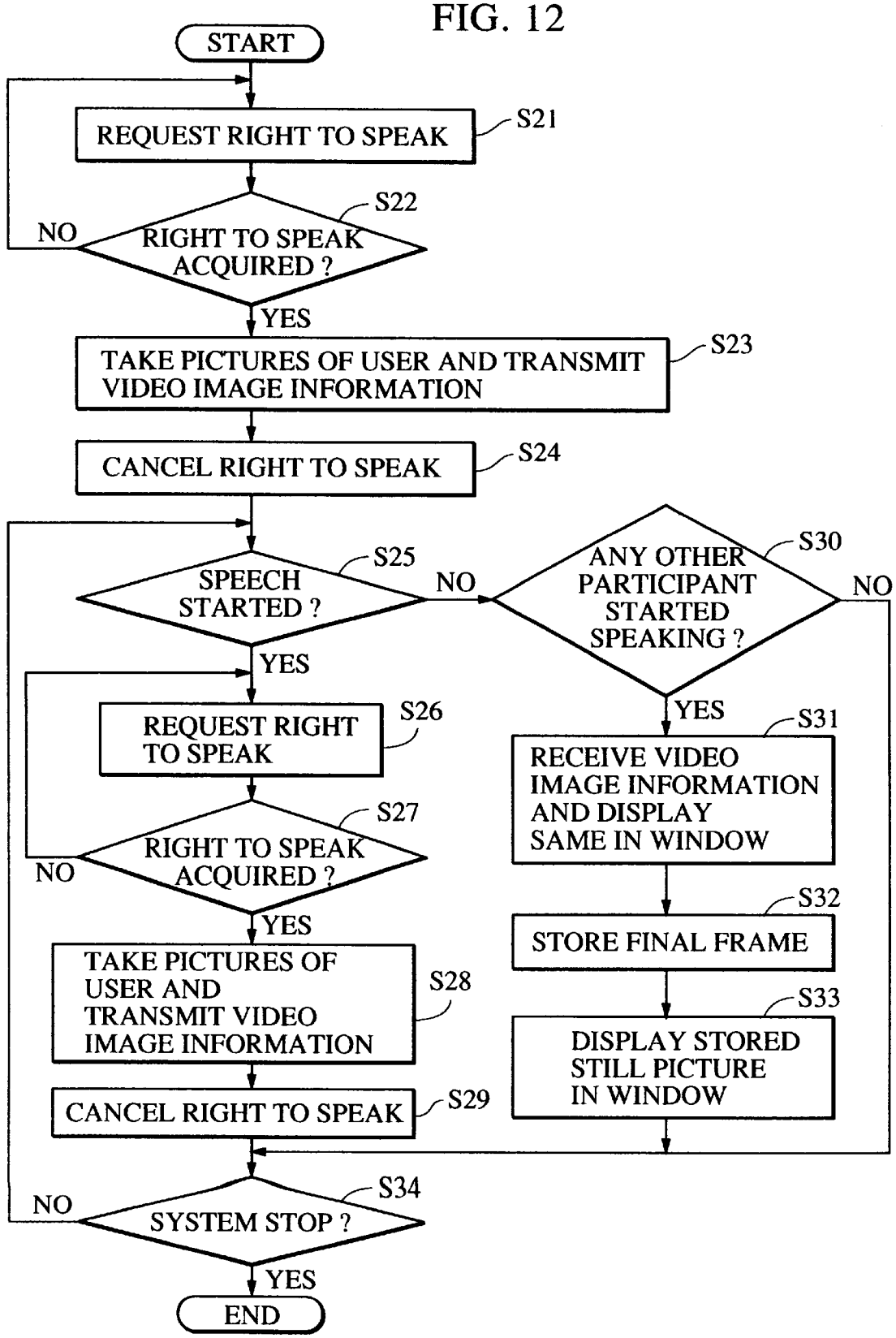

TERMINAL APPARATUS

BACKGROUND OF THE INVENTION

1. Field of the Invention

The present invention relates to a terminal apparatus capable of suitably operating by transmitting at least video and audio data to hold a TV conference.

2. Description of the Related Art

An apparatus such as that shown in FIG. 1 is known as a conventional terminal of a TV conference system. As shown in FIG. 1, the terminal apparatus has a TV camera 10 for taking pictures of conference participants, a monitor 11 for displaying images of conference participants, materials used for conference and the like, a TV camera 12 for taking pictures of materials 14 such as drawings and originals on a material table 13, a video control section 15 for encoding and decoding video signals, a microphone 16, a speaker 17, an audio control section 18 for encoding and decoding audio signals, i.e., a signal supplied from the microphone 16 and a signal supplied to the speaker 17, a communication control section 19 for transmitting and receiving audio and video signals, an operating section 20 for operating the system, and a system control section 21 for control of the entire system.

A plurality of terminals each having this configuration are connected to each other through a communication circuit (not shown) such as a Local Area Network or a public telephone system and are used to hold a TV conference by transmitting and receiving video and audio signals.

FIG. 2 illustrates an example of a display on the monitor 11 when a TV conference is held. As illustrated, a picture 30 on the monitor 11 is formed of a conference room display window 31 in which a scene of a conference room in which another terminal is placed is displayed, a conference material display window 32 in which conference materials are displayed, a common board window 33 which is used for cooperative work and in which drawings, sentences or the like can be written from all conference rooms, and a personal work window 34 for doing personal work in each individual conference room.

In the conventional TV conference system arranged as described above, a picture of the entire conference room is taken by TV camera 10. Therefore, images of individual participants as displayed are so small that facial expressions of the speakers may be obscure. As a result, it is difficult for each of participants in a conference to grasp the ambiance of the conference.

FIG. 3 shows an example of another display on the monitor when a TV conference is held. A picture 35 on the monitor 11 in this example is generally the same as the above-described picture 30, but differs from the picture 30 in that the conference room display window 31 is replaced with a participant display window 36 for displaying conference participants at each of terminals connected through the communication circuit. Video images of the participants are always displayed in the participant display window 36.

In the example shown in FIG. 3, participants can grasp the ambiance of the conference. However, the amount of communication data exchanged between terminals is very large because information of a plurality of video images of conference participants is always being transmitted and received and the images displayed on the participant display window 36. Thus, the processing load imposed upon each terminal is large.

Also in the conventional TV conference system, audio signals input from microphones 16 are always transmitted and received. The amount of communication data between terminals is further increased thereby, so that the processing load upon each terminal is considerable. Further, even when no conference participants are speaking, any noise generated around each terminal is input through microphone 16 and transmitted to the other terminals. Such noise acts as a hindrance to the conference.

SUMMARY OF THE INVENTION

In view of these circumstances, an object of the present invention is to provide a terminal apparatus which enables participants in a TV conference to grasp the ambiance of the conference without operating a TV camera each time the speaker changes and without increasing the amount of communication data between terminals so that the processing load imposed upon each terminal is large.

To achieve this object, according to one aspect of the present invention, there is provided a terminal apparatus capable of holding a TV conference by communicating at least images and speeches comprising a camera for taking a picture of participants in a TV conference to obtain video information, a plurality of audio input means for inputting audio information of each participant in the TV conference, and control means for controlling a zooming state of the camera according to an audio input condition of the plurality of audio input means.

According to another aspect of the present invention, there is provided a terminal apparatus comprising video input means for inputting video information, audio input means for inputting audio information related to the video information, and audio transmission means for transmitting the video information according to an audio input condition of the audio input means.

According to still another aspect of the present invention, there is provided a terminal apparatus comprising audio input means for inputting audio information, and audio transmission means for transmitting audio information to an external terminal according to an audio input condition of the audio input means.

Other objects, features and advantages of the invention will become apparent from the following detailed description taken in conjunction with the accompanying drawings.

BRIEF DESCRIPTION OF THE DRAWINGS

FIG. 12 is a flowchart of an example of the operation when dynamic image information is transmitted and received;

DESCRIPTION OF THE PREFERRED EMBODIMENTS

Preferred embodiments of the present invention will be described with reference to the accompanying drawings.

Figure 4:
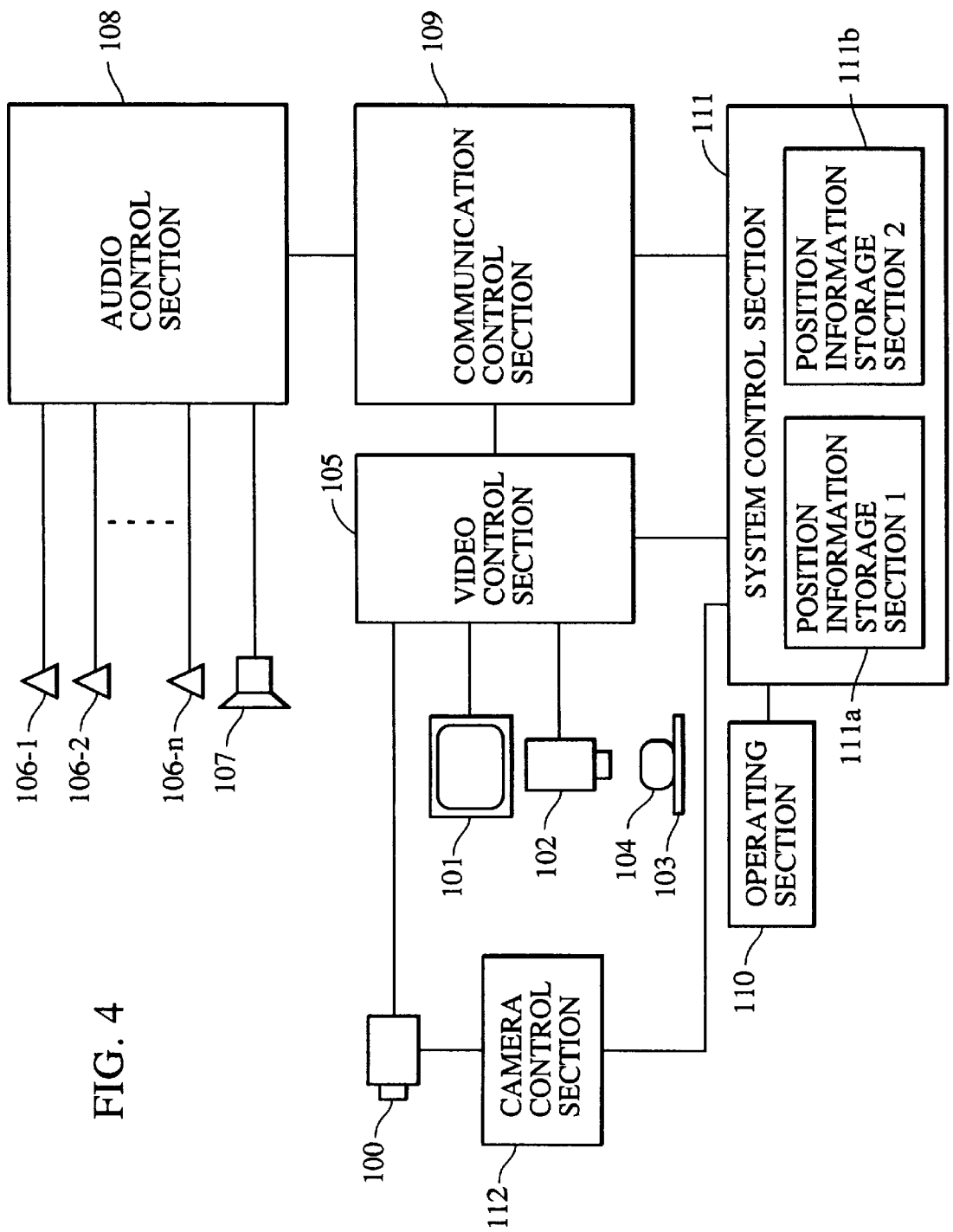
FIG. 4 is a block diagram showing the configuration of a terminal apparatus in accordance with a first embodiment of the present invention.

A TV conference terminal in accordance with a first embodiment of the present invention has a configuration such as shown in the block diagram of FIG. 4.

Referring to FIG. 4, the TV conference terminal has a TV camera 100 for taking pictures of conference participants (not shown), a monitor 101 for displaying images of conference participants, materials used for the conference and the like, a TV camera 102 for taking pictures of materials 14 such as drawings and originals on a material table 103, and a video control section 15 for encoding and decoding video signals.

The terminal also has n microphones 106-1 to 106-n assigned to n conference participants in a one-to-one relationship, a speaker 107, and an audio control section 108 for encoding and decoding audio signals, i.e., signals supplied from the microphones 106-1 to 106-n and a signal supplied to the speaker 107. The audio control section 108 always monitors the n microphones 106-1 to 106-n. If the audio control section 108 detects an audio input from any of the microphones, it informs a system control section 111 described below of this input. A communication control section 109 transmits and receives video signals. An operating section 110 is used to operate the system and is constituted by a mouse, a keyboard and the like.

The system control section 111 controls the entire system and has internal sections: a first position information storage section 111a and a second position information storage section 111b. The first position information storage section 111a stores picture-taking position information of the TV camera 100 for taking pictures of all the conference participants. The second position information storage section 111b stores picture-taking position information of the TV camera 100 for taking a close-up picture of each conference participant.

A camera control section 102 controls the picture-taking position of the TV camera 100 by controlling zooming, panning and tilting of the TV camera 100. Before a TV conference is started, each conference participant can perform a process of operating the operating section 110, instructing the camera control section 112 through the system control section 111 to adjust the picture-taking position of the TV camera 100 and registering picture-taking position information obtained at this time in the first and second position information storage sections 111a and 111b.

After the TV conference has been started, the picture-taking position information registered in the first and second position information storage sections 111a and 111b is read out according to the result of audio signals sent from the audio control section 108 to the system control section 111. The camera control section 112 automatically controls the picture-taking position of the TV camera 100 based on the picture-taking position information read out.

Figure 5:
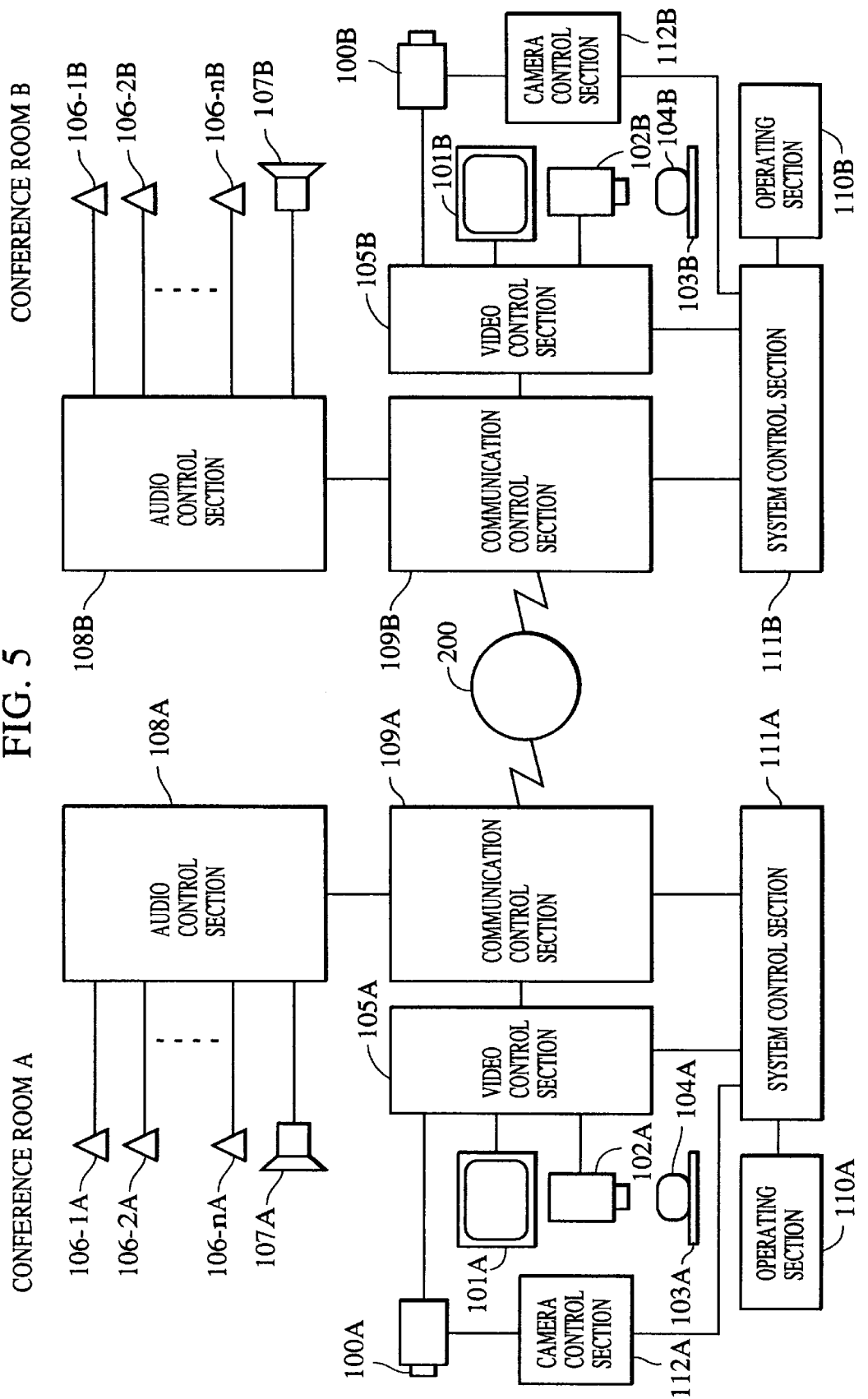
FIG. 5 is a diagram showing the configuration of a TV conference system using the terminal apparatus of the first embodiment shown in FIG. 4.

FIG. 5 shows a system configuration in a case where terminals arranged as shown in FIG. 4 are respectively prepared in first and second conference rooms A and B, and where a TV conference is held between the conference rooms A and B.

In FIG. 5, characters A and B are added to the reference characters shown in FIG. 4 to discriminate the internal sections or components of the terminals respectively used in the conference rooms A and B from each other. The two terminals are connected to each other through a communication circuit 200.

The operation when a TV conference is held between the conference rooms A and B will be described below. The operation when picture-taking position information of the TV camera 100 is registered will first be described with reference to the flowchart of FIG. 6.

For the following description, it is assumed that there are four conference participants, Sato, Tanaka, Suzuki and Murata in the first conference room A, and that first to fourth microphones 106-1 to 106-4 are assigned to these participants.

Figure 6:
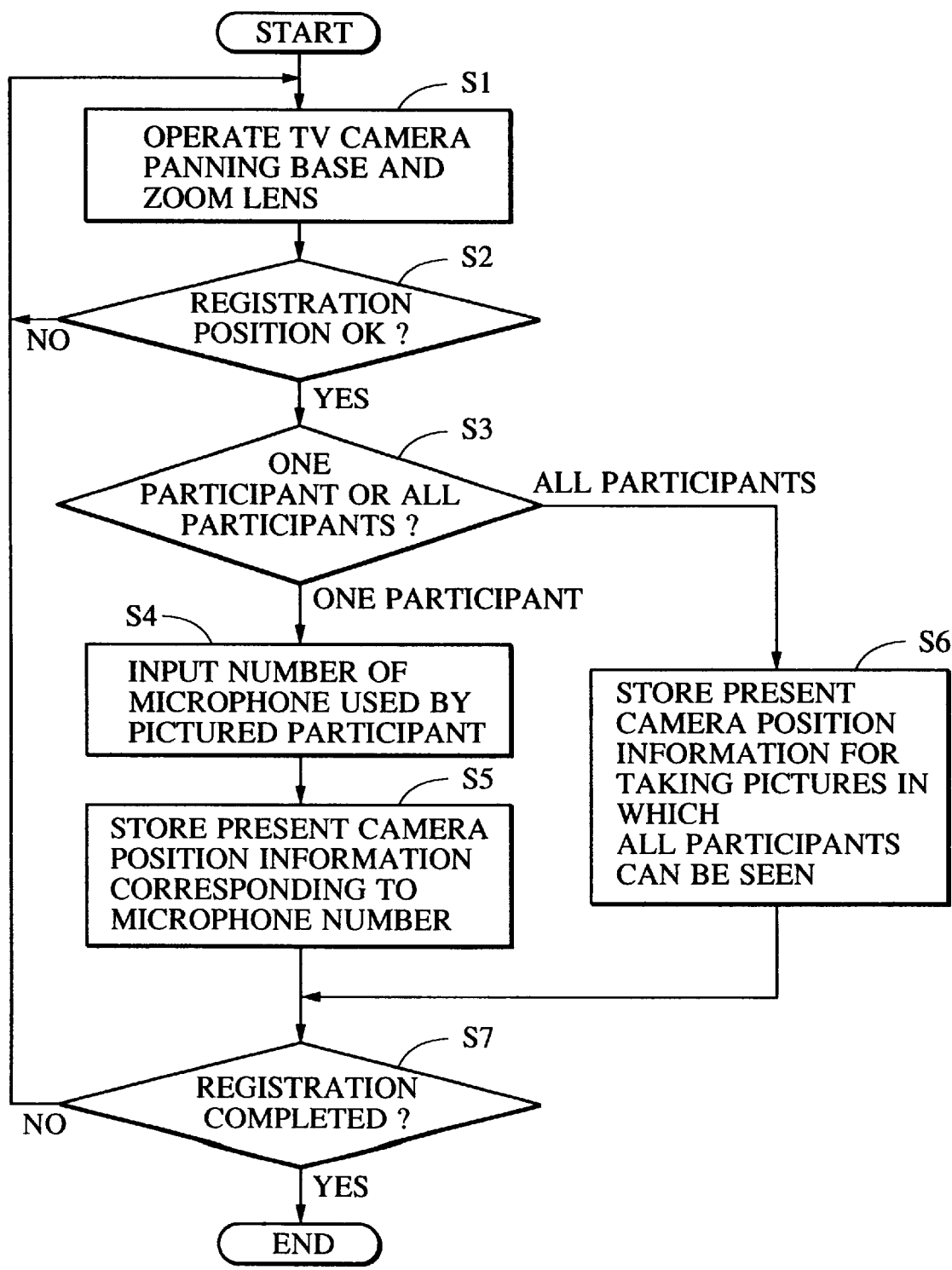
FIG. 6 is a flowchart of a process in which picture taking positions of the TV camera are registered.

Referring to FIG. 6, in step S1, before TV conference with persons in the second conference room B is started, an operator inputs an instruction to the camera control section 112A by using the operating section 110A in the first conference room A to perform panning, tilting and zooming of the TV camera in order to determine a picture-taking position (registered position). If a picture-taking position is determined in step S2, the operator inputs, by using the operating section 110A, information as to whether the picture-taking object is one or all of the conference participants in step S3.

If information indicating that the object is one conference participant is input, one of the microphone numbers (106-1 to 106-4) used by the conference participant as the picture-taking object is input in step S4. Thereafter, in step S5, the system control section 111A fetches information indicating the direction in which the TV camera 100A faces presently, a zooming ratio and the like as picture-taking position information for close-up picture-taking of the individual conference participant from the camera control section 112A, and stores the fetched picture-taking position information in the second position information storage section 111b in correspondence with the microphone number input in step S4.

If the picture-taking object is all of the conference participants (if information indicating that the object is all the conference participants is input in step S4), the system control section 111A fetches, in step S6, information indicating the direction in which the TV camera 100A faces presently, a zooming ratio and the like as picture-taking position information for taking a picture of all the conference participants from the camera control section 112A, and stores the fetched picture-taking position information in the first position information storage section 111a.

Figure 7:
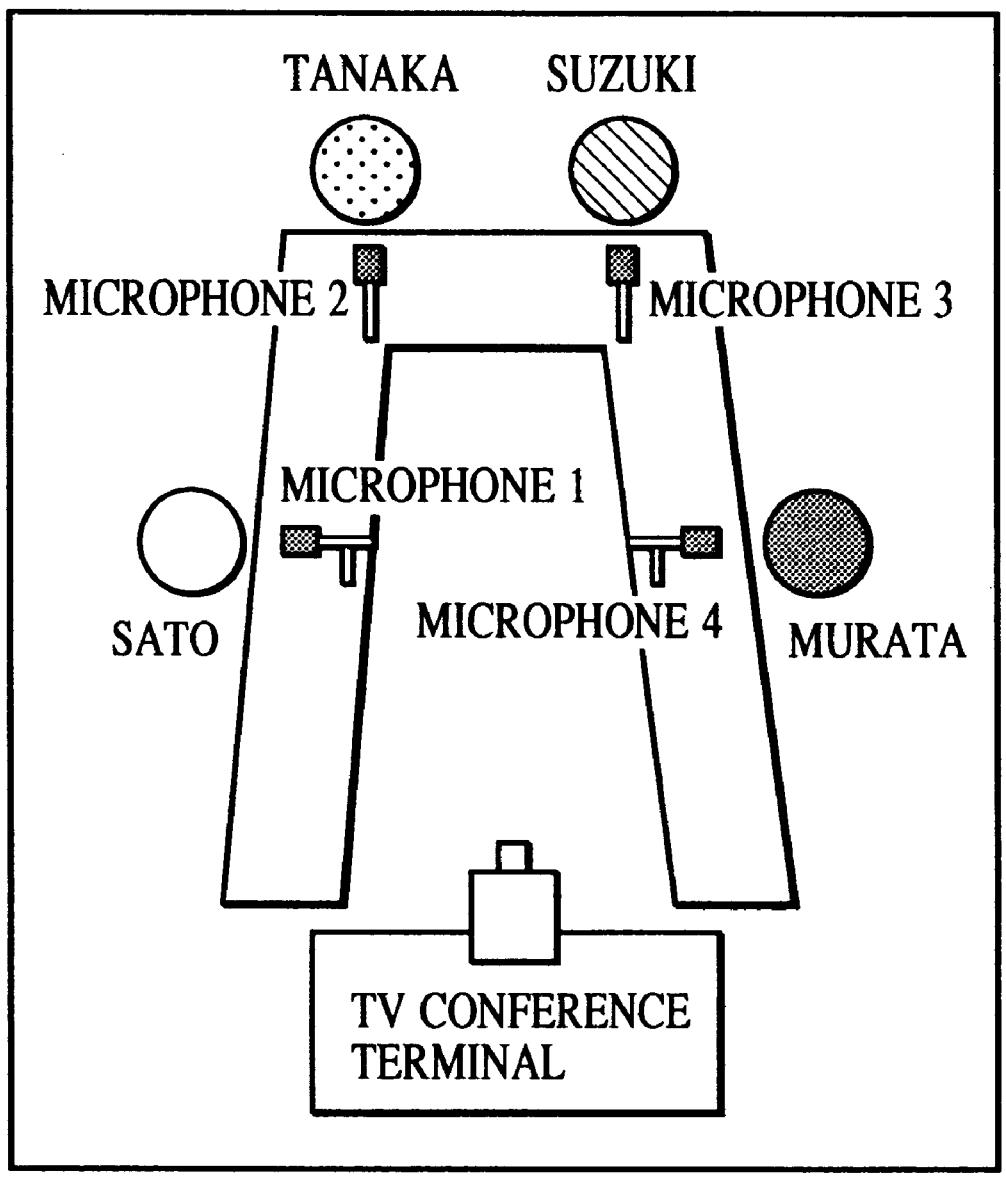
FIG. 7 is a diagram of a scene in a conference room for holding a TV conference.

In step S7, a determination is made as to whether all necessary items of picture-taking position information for taking a picture of each of the conference participants and picture-taking position information for taking a picture of all the conference participants have been registered. Processing from step S1 to S6 is repeated until all the necessary information items are registered. In the case of the example shown in FIG. 7, picture-taking position information of TV camera 100A for taking pictures such as those shown in FIGS. 8(a)–8(e) is finally stored in the first and second position information storage sections 111a and 111b in the system control section 111A.

Figure 9:
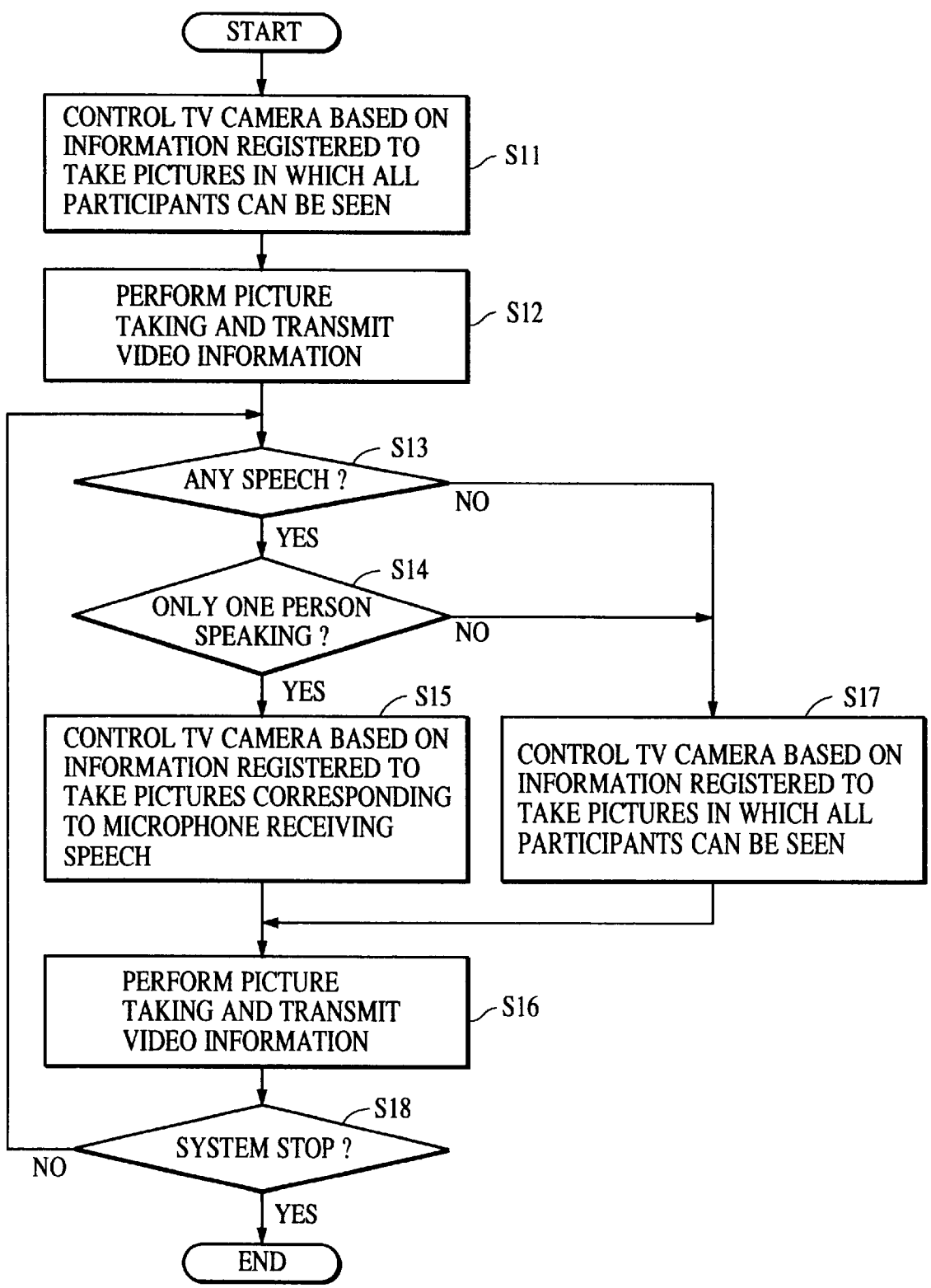
FIG. 9 is a flowchart of the operation when a TV conference is held by using registered picture-taking position information.

The operation after the start of the TV conference will next be described with reference to the flowchart of FIG. 9.

Figure 8A:
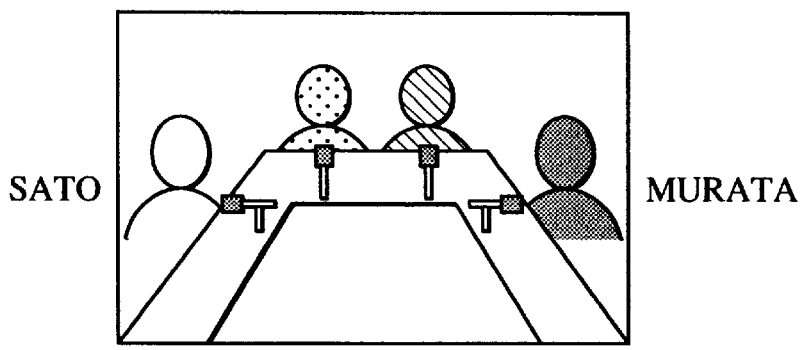
FIGS. 8(a)–8(e) are examples of pictures taken on the basis of registered picture-taking position information.
Figure 8B:
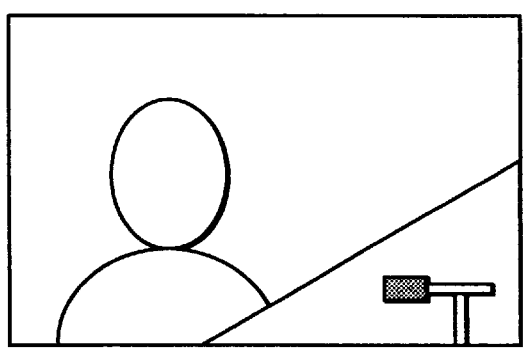
Figure 8C:
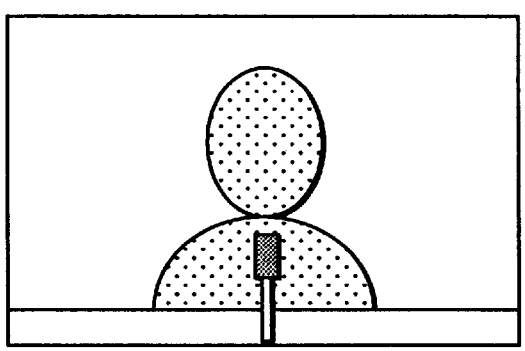
Figure 8D:
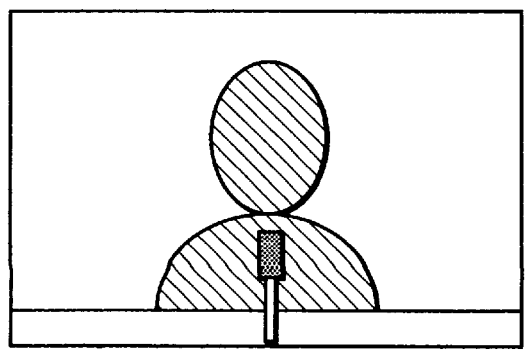
Figure 8E:
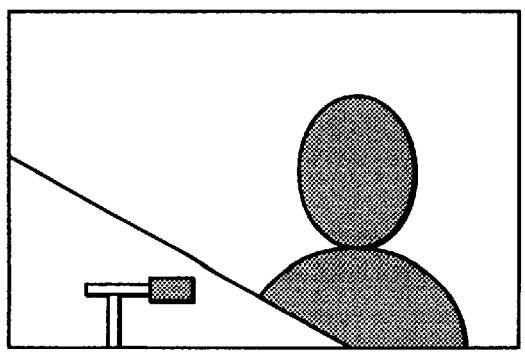

The terminal in the first conference room A and the terminal in the second conference room B are connected through the communication circuit 200 and the TV conference begun. Then, in step S11, the camera control section 112A controls the picture-taking position of the TV camera 100A on the basis of the picture-taking position information for taking a picture of all the conference participants stored in the first position information storage section 111a in the system control section 111A. When positioning of the TV camera 100A is completed, picture-taking of all the conference participants is started in step S12 and an image such as that shown in FIG. 8(a) is transmitted to the terminal in the second conference room B.

As mentioned above, the audio control section 108A always monitors all the microphones 106-1A to 106-nA connected thereto. If the audio control section 108A detects an audio input from any of the microphones, i.e., the sound of one or more of the conference participants speaking in step S13, it makes a determination in step S14 as to whether only one of the participants or two or more of the participants are speaking.

If only one participant is speaking, the camera control section 112A controls, in step S15, the picture-taking position of the TV camera 100A on the basis of the picture-taking position information corresponding to the number of the microphone receiving the voice among the four groups of picture-taking position information stored in the second position information storage section 111b in the system control section 111A (the picture-taking position information for taking a picture of the individual speaker).

For example, if the microphone 106-1A has picked up the sound of Sato's voice, the camera control section 112A controls the picture-taking position of the TV camera 100A on the basis of the picture-taking position information corresponding to the microphone number 1 and stored in the second position information storage section 111b. When positioning of the TV camera 100A is completed, the operation of taking a picture of the speaker is started in step S16 and an image such as that shown in FIG. 18(b) is transmitted to the terminal in the second conference room B.

If two or more of the participants are speaking, the process advances to step S17, in which the camera control section 112A controls the picture-taking position of the TV camera 100A on the basis of the picture-taking position information for taking a picture of all the conference participants stored in the first position information storage section 111a in the system control section 111A. When positioning of the TV camera 100A is completed, the operation of taking a picture of all the conference participants is started in step S16 and an image such as that shown in FIG. 18(a) is transmitted to the terminal in the second conference room B.

In a case where it is determined in step S13 that none of the conference participants is speaking, the processing in steps S17 and S16 is also performed. Finally, a determination is made in step S18 as to whether an instruction to stop the system has been given. If no, the process returns to step S13. Processing from steps S13 to S17 is repeated until the system is stopped.

As described above, in the first embodiment, picture-taking position information for taking a picture of all the conference participants and picture-taking position information for taking a close-up picture of each individual conference participant are stored before a TV conference is started. After the TV conference has been started, audio inputs from the microphones 106-1 to 106-n respectively assigned to the conference participants are detected by the audio control section 108, and the picture-taking position of the TV camera 100 is controlled on the basis of one of the above-mentioned groups of information according to the result of a detection made by the audio control section 108. Consequently, when one of the conference participants starts speaking, a picture of that speaker can be automatically taken in a close-up manner. When two or more of the conference participants start speaking simultaneously, a picture of all the conference participants can be automatically taken in which all the speakers can be seen.

Figure 10:
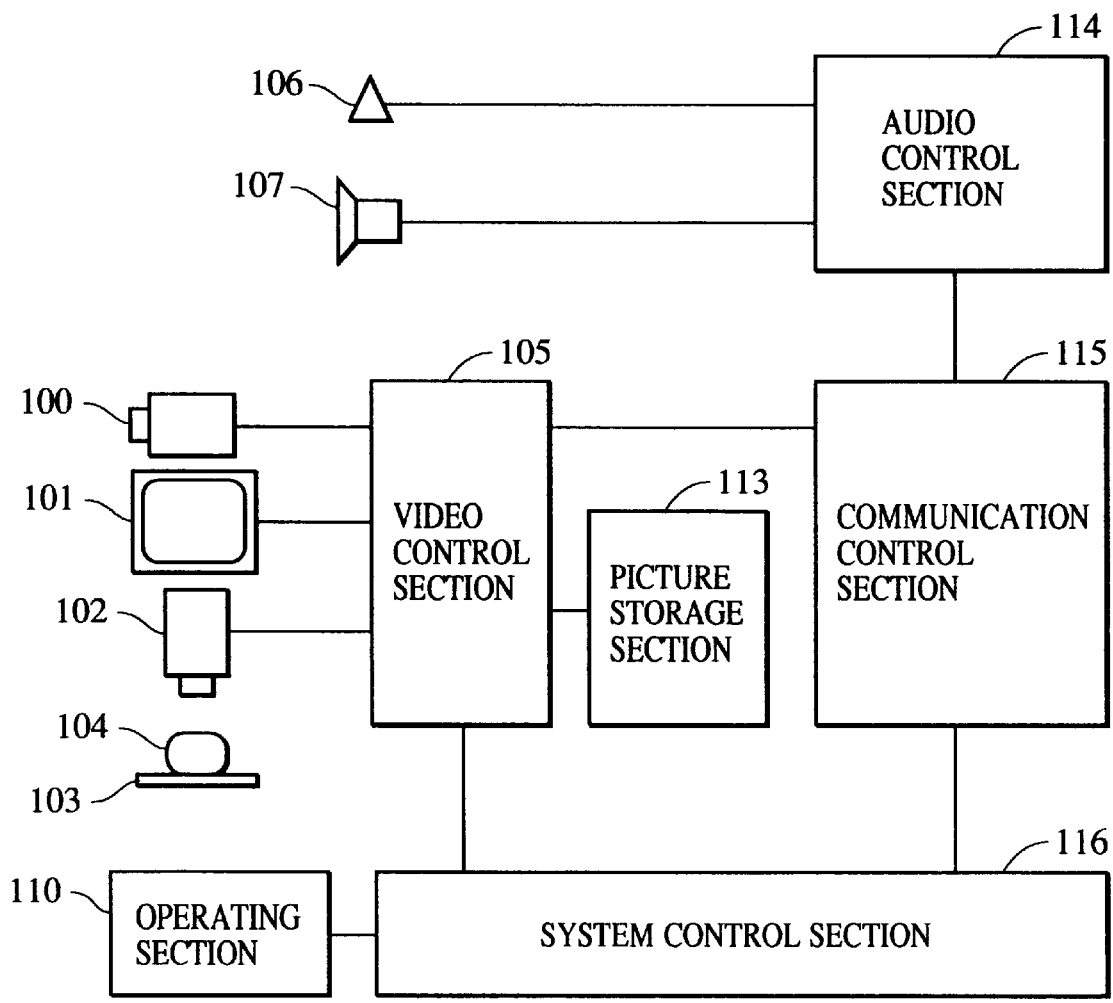
FIG. 10 is a block diagram showing the configuration of a terminal apparatus in accordance with a second embodiment of the present invention.

FIG. 10 is a block diagram showing the configuration of a TV conference terminal in accordance with a second embodiment of the present invention.

In FIG. 10, the same blocks or components as those shown in FIG. 4 are indicated by the same reference characters. The description for the same components will not be repeated.

Figure 1:
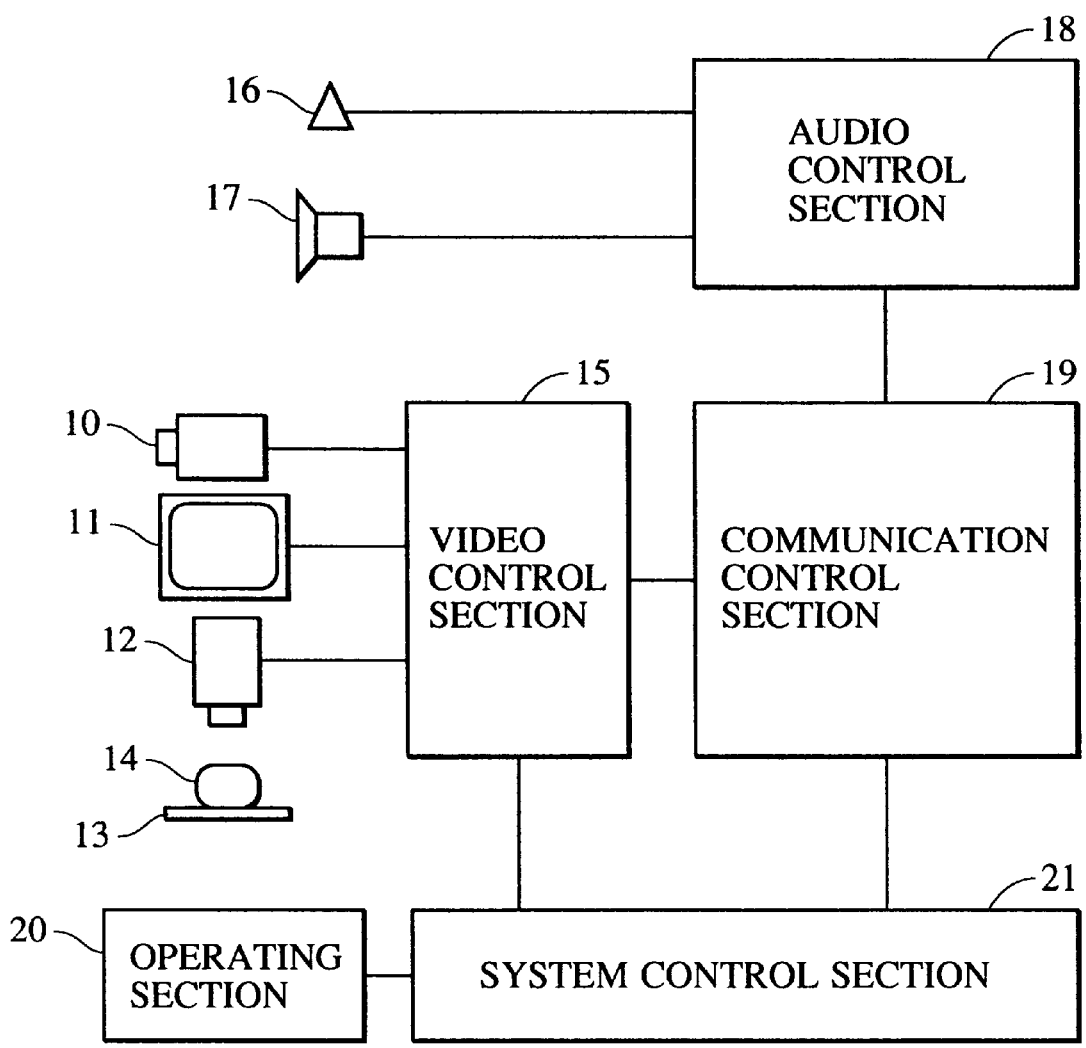
FIG. 1 is a block diagram showing the configuration of a conventional terminal apparatus.
Figure 2:
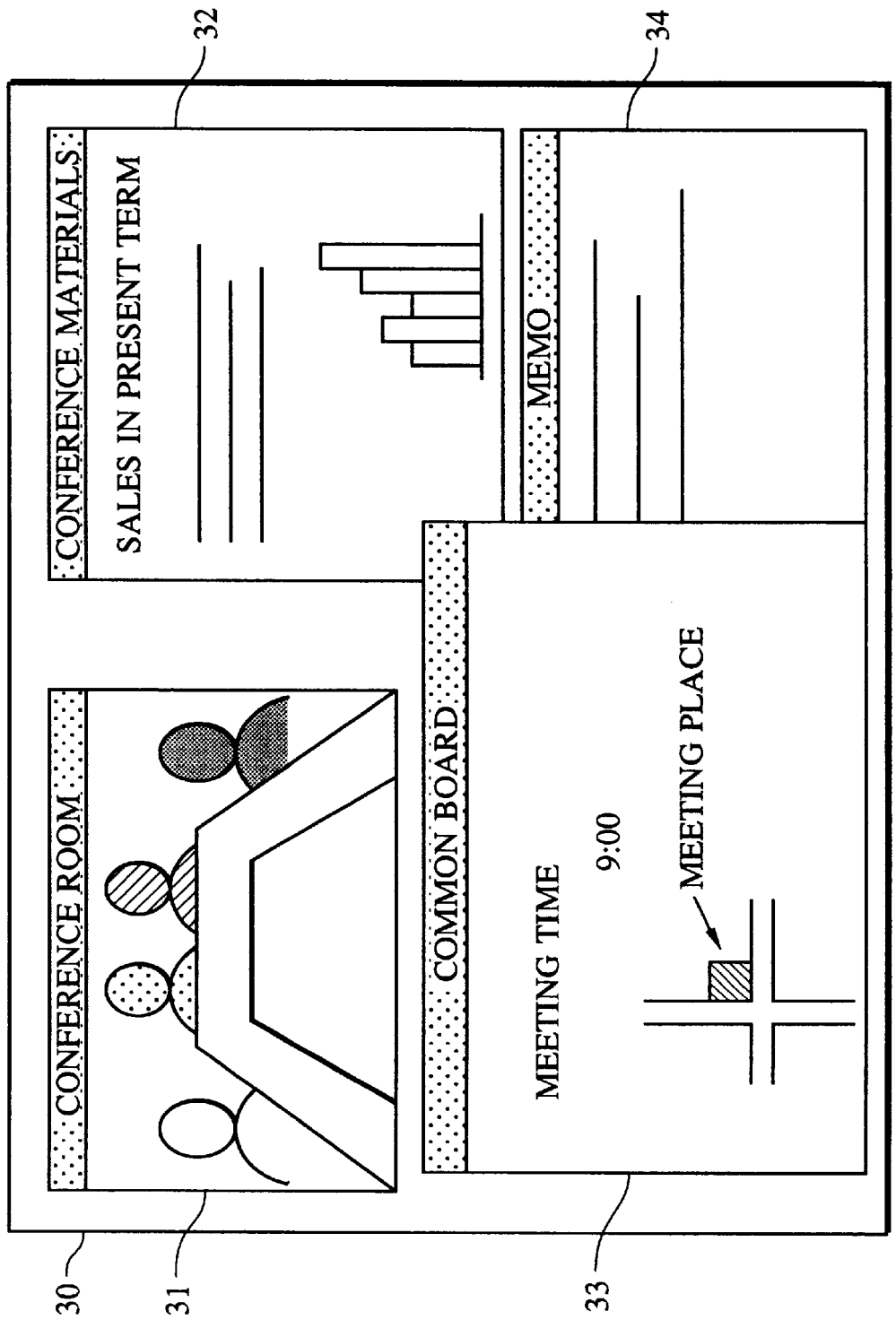
FIG. 2 is a diagram of an example of a display picture on a monitor of the conventional terminal apparatus.
Figure 3:
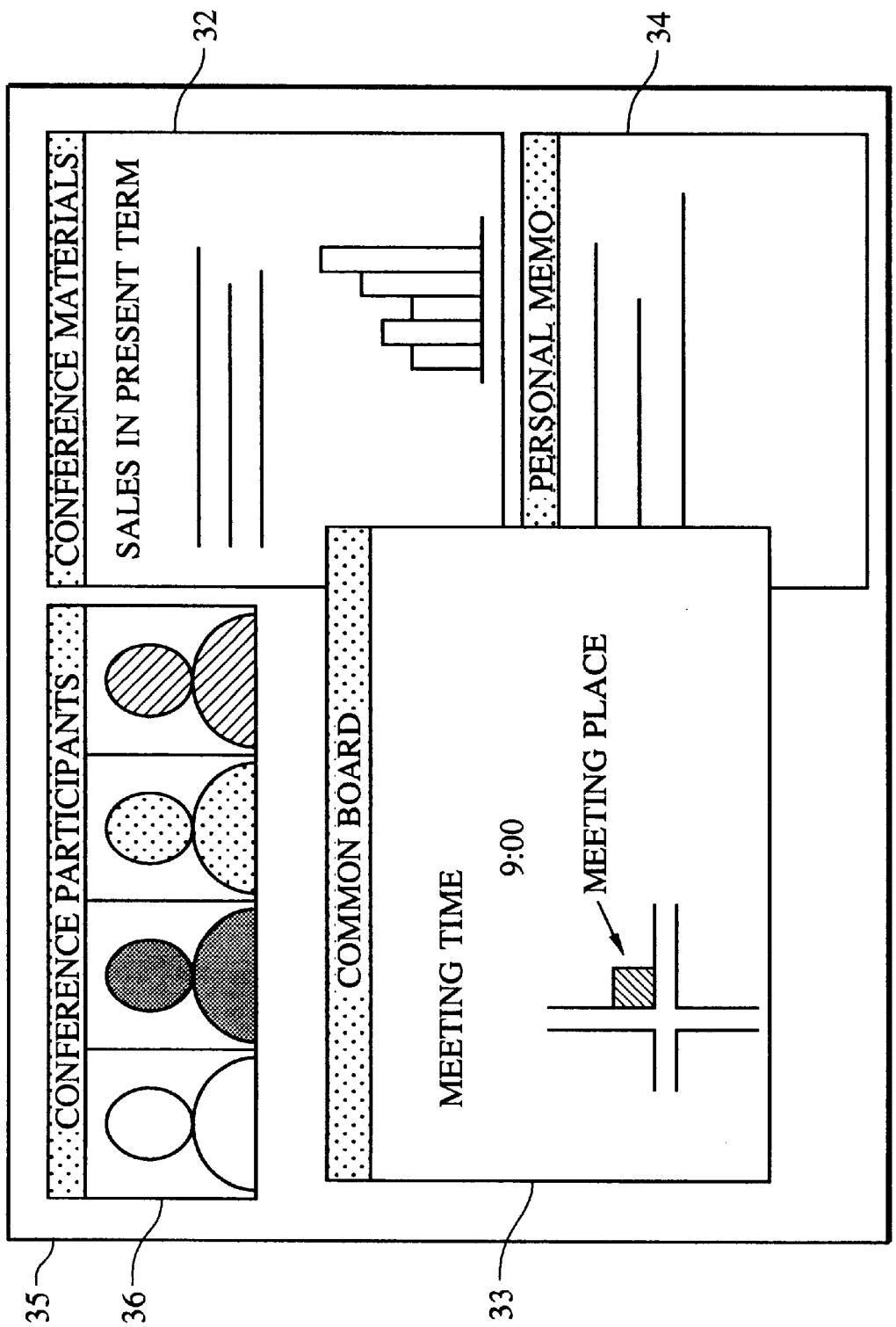
FIG. 3 is a diagram of another example of the display picture on the monitor of the conventional terminal apparatus.

As shown in FIG. 10, the terminal has a microphone 106, a picture storage section 113 for storing a final frame picture of a video image received from another terminal through a communication control section 115, an audio control section 114 for encoding and decoding audio signals, i.e., a signal supplied from the microphone 106 and a signal supplied to a speaker 107, and a system control section 116 for control of the entire system. A picture on the monitor 101 has a conference participant display window 36 such as shown in FIG. 3.

The above-mentioned communication control section 115 transmits and receives video information and audio information and is arranged to transmit and receive video information on video image pictures and audio information of a speaking conference participant only when the conference participant is speaking. Accordingly, when the conference participant is speaking, video image information of the speaker is displayed in the corresponding portion of the conference participant display window 36 while audio information is output to the speaker 107. When the conference participant is not speaking, a sill picture stored in the picture storage section 113 is displayed in the corresponding portion of the conference participant display window 36, and no audio information is output to the speaker 107.

Figure 11A:
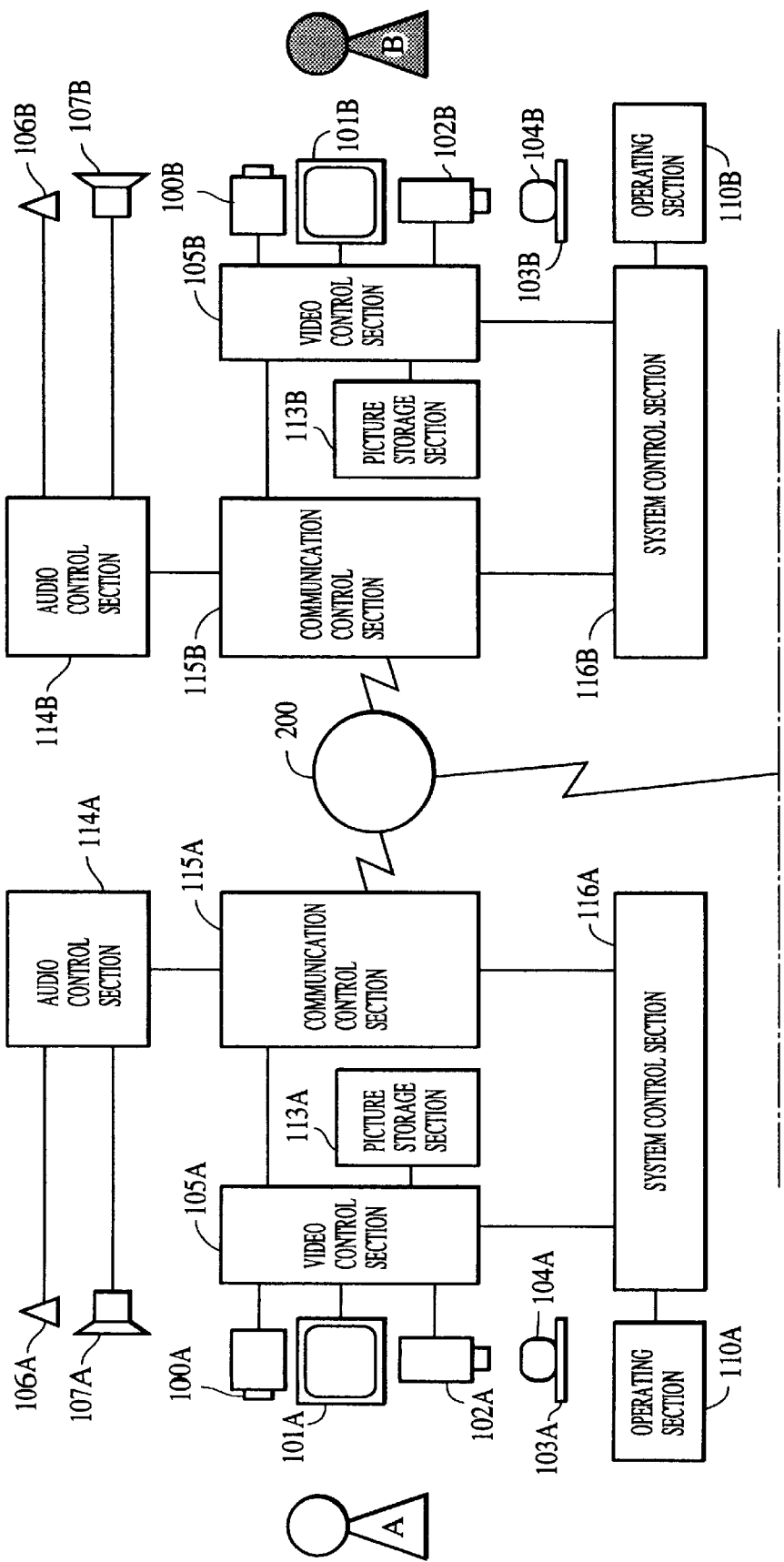
FIG. 11, which consists of FIGS. 11A and 11B, is a diagram showing the configuration of a TV conference system using the terminal apparatus of the second embodiment.

FIG. 11 shows a system configuration in a case where a plurality of terminals each arranged as shown in FIG. 10 are used for TV conference between three conference participants (participants A, participant B, and participant C, hereinafter) in first to third conference rooms A, B, and C.

In FIG. 11, characters A, B and C are added to the reference characters shown in FIG. 10 to discriminate the internal sections or components of the terminals respectively used in the conference rooms A, B and C from each other. The three terminals are connected to each other through a communication circuit 200.

The operation when a TV conference is held between the conference rooms A, B and C will be described below.

An example of the operation when dynamic image information is transmitted and received in the terminal utilized by the participant A will first be described with reference to the flowchart of FIG. 12.

Referring to FIG. 12, when the participant A participates in the TV conference, the terminal utilized by the participant A automatically requests the right to speak in step S21. If the right to speak is acquired in step S22, the process advances to step S23 to start taking pictures of the participant A by the TV camera 100A, and video image information obtained by this picture-taking is transmitted to each of the terminals utilized by the participants B and C. When a speech of the participant A is finished, the terminal utilized by the participant A cancels the right to speak in step S24.

If the participant A again starts speaking in step 25, he or she operates the operating section 110A in step S26 to request the right to speak. If the right to speak is acquired in step S27, the operation of taking pictures of the participant A by the TV camera 100A is again started in step S28 and video image information obtained by this picture-taking is transmitted to each of the terminals utilized by the participants B and C. When the speech of the participant A is finished, the right to speak is canceled in step S29.

On the other hand, if the participant A does not start speaking in step S25, and if conference participant B or C starts speaking in step S30, video image information sent from the terminal utilized by the participant B or C is received in step S31 and received video image information is displayed on the corresponding portion of the participant display window 36 on the monitor 101A. Thereafter, when a speech of the participant B or C is finished, a final frame picture of the received video image is stored as a still picture in the picture storage section 113 in step S32. In step S33, the still image stored in step S32 is displayed in the window where the video image has been displayed.

Finally, a determination is made in step S34 as to whether an instruction to stop the system has been given. If no, the process returns to step S25. Processing from steps S25 to S33 is repeated until the system is stopped.

Another example of the operation when video image information is transmitted and received in the terminal utilized by the participant A will next be described with reference to the flowchart of FIGS. 13A and 13B.

The operation at the time of transmission of video image information will first be described with reference to the flowchart of FIG. 13A.

Figure 13A:
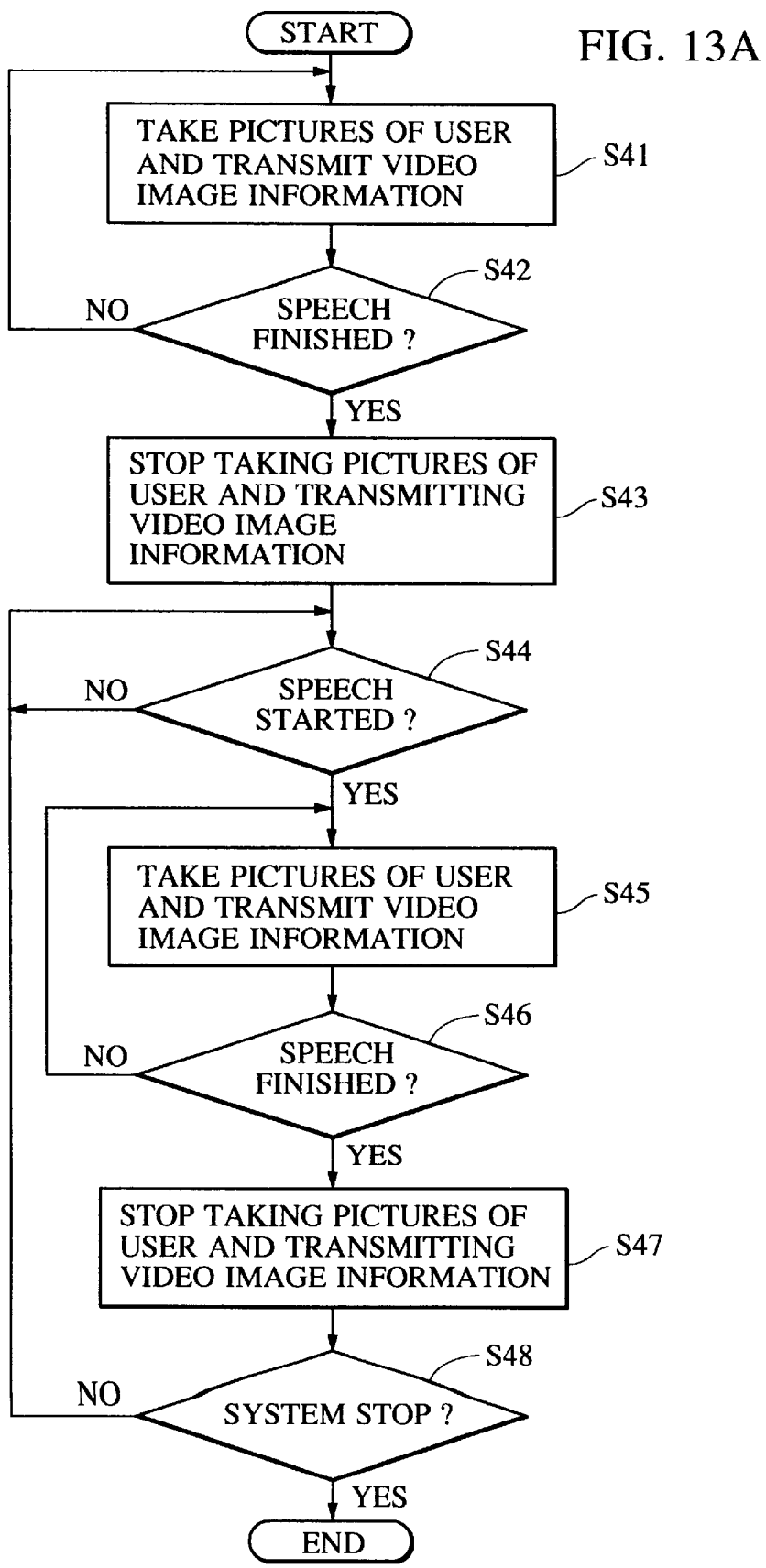
FIGS. 13A and 13B form a flowchart of another example of the operation when video image information is transmitted and received.

Referring to FIG. 13A, when the participant A participates in the TV conference, the terminal utilized by the participant A starts taking pictures of the participant A by the TV camera 100A in step S41 and transmits video image information obtained by this picture-taking to the other terminals utilized by the participants B and C. If no voice is received from the participant A during a certain time period, the terminal utilized by the participant A determines that the speech of the participant A is finished in step S42 and stops taking pictures of the participant A and transmitting video image information in step S43.

If the participant A again starts speaking, the terminal utilized by the participant A automatically detects a start of his or her speech in step S44, and again starts taking pictures of the participant A by the TV camera 100A in step S45 to transmit video image information obtained by this picture-taking to the other terminals utilized by the participants B and C. Thereafter, an end of the speech of the participant A is automatically detected in step S46 as in the case of the above-mentioned detection of the start of speech in step S44, and taking pictures of the participant A and transmitting video image information are stopped in step S47.

Finally, a determination is made in step S48 as to whether an instruction to stop the system has been given. If no, the process returns to step S44. Processing from steps S44 to S47 is repeated until the system is stopped.

The operation at the time of reception of video image information will next be described with reference to the flowchart of FIG. 13B.

Figure 13B:
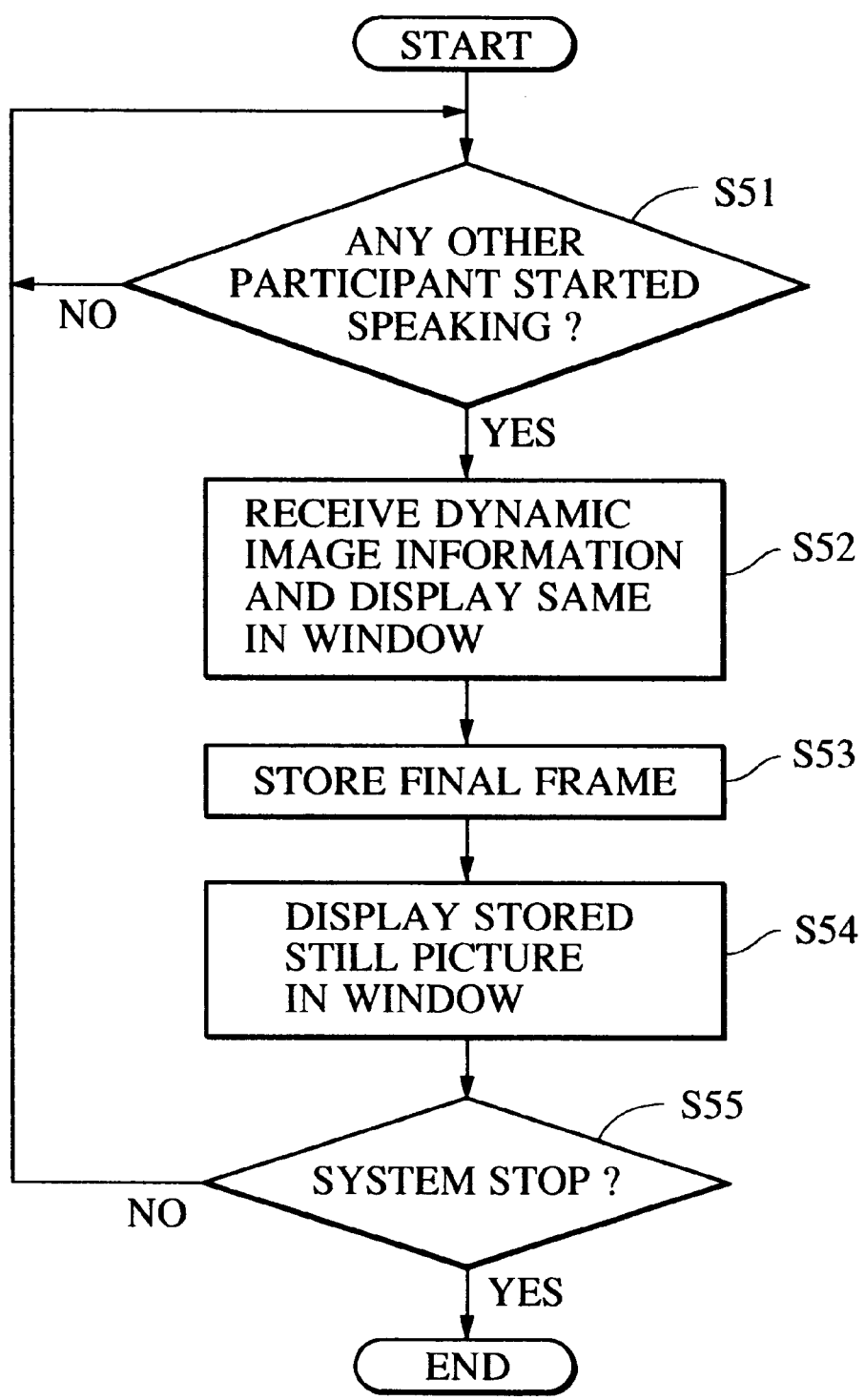

Referring to FIG. 13B, if the participant B or C other than the participant A starts speaking in step S51, video image information sent from the terminal utilized by the participant B or C is received in step S52 and the received video image information is displayed in the corresponding portion of the participant display window 36 on the monitor 101A.

Thereafter, when the speech of the participant B or C is finished, a final frame picture of the received video image is stored as a still picture in the picture storage section 113 in step S53. In step S54, the still image stored in step S53 is displayed in the window where the video image has been displayed. Finally, a determination is made in step S55 as to whether an instruction to stop the system has been given. If no, the process returns to step S51.

An example of the operation when audio information is transmitted from the terminal utilized by the participant A will be described with reference to the flowchart of FIG. 14.

Figure 14:
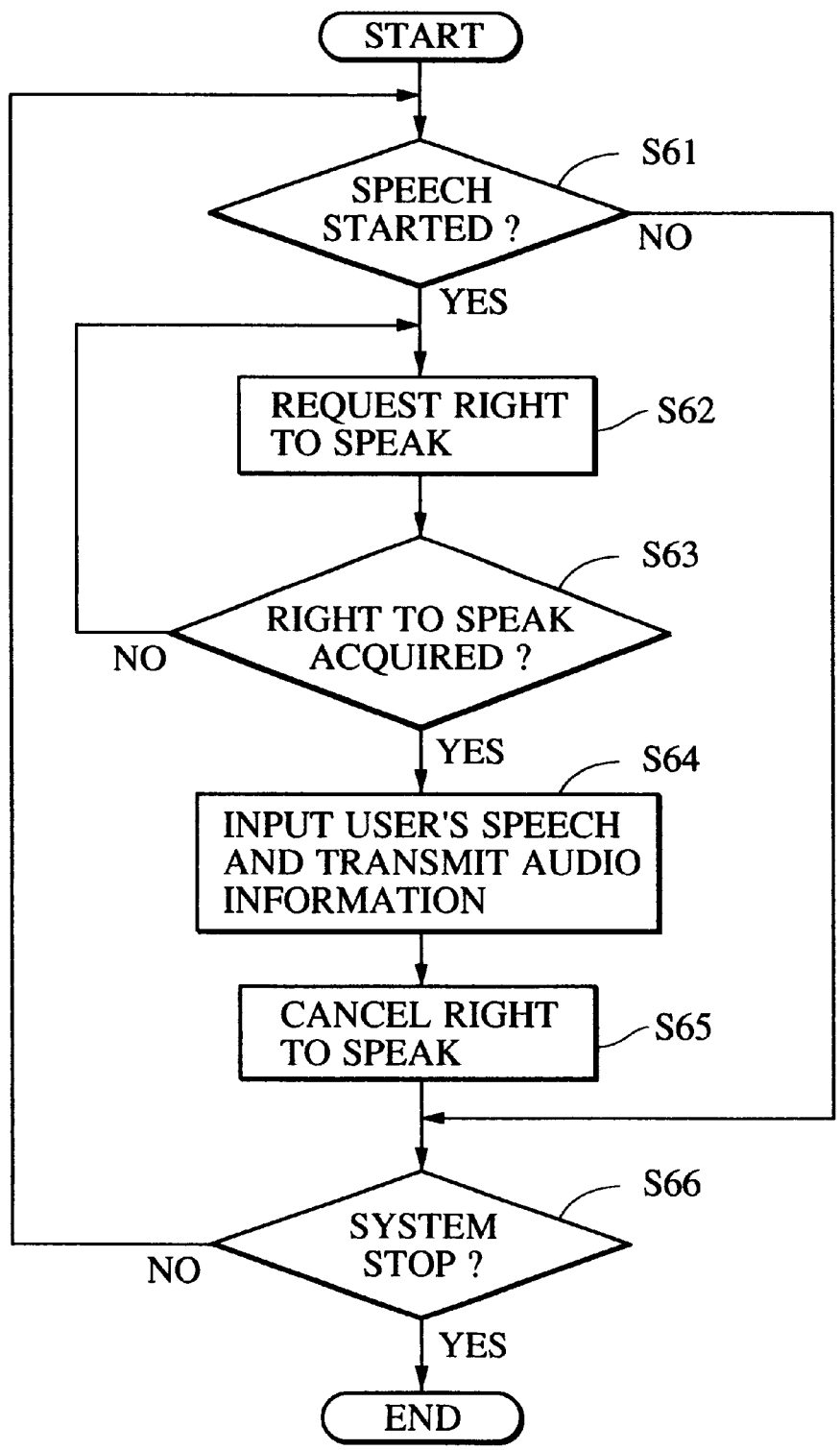
FIG. 14 is a flowchart of an example of the operation when audio information is transmitted.

Referring to FIG. 14, if the participant A starts speaking in step S61, he or she operates the operating section 110A in step S62 to request the right to speak. If the right to speak is acquired in step S63, the speech of the participant A from the microphone 106 is input in step S64 and the input audio information is transmitted to the other terminals utilized by the participants B and C. Thereafter, when the speech of the participant A is finished, the right to speak is canceled by operating the operating section 110A. The above processing is repeated until a stop of the conference is determined in step S66.

Another example of the operation when audio information is transmitted from the terminal utilized by the participant A will be described with reference to the flowchart of FIG. 15.

Figure 15:
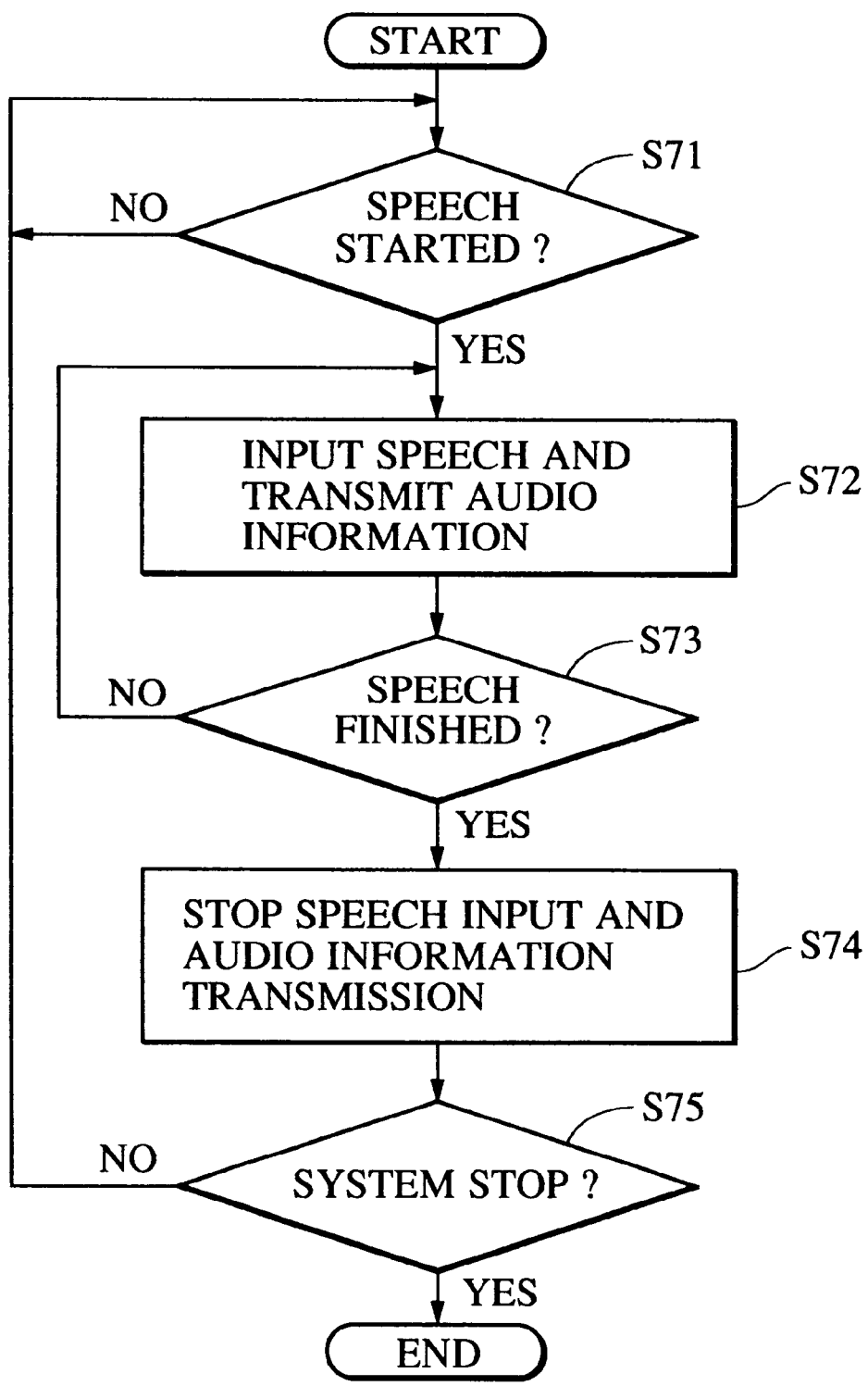
FIG. 15 is a flowchart of another example of the operation when audio information is transmitted.

Referring to FIG. 15, if the participant A starts speaking in step S71, the audio control section 114A of the terminal utilized by the participant A automatically detects the start of the speech of the participant A by an audio input from the microphone 106A. In step S72, the speech of the participant A is input and the input audio information is transmitted to the other terminals utilized by the participants B and C.

In step S73, the audio control section 114A automatically determines an end of the speech of the participant A by detecting a lapse of a certain time period during which no audio input is supplied from the microphone 106A. In step S74, audio input and transmission of input audio information of the participant A are stopped. The above processing is repeated until a stop of the conference is determined in step S75.

In the cases shown in FIGS. 12 and 14, all the video image information and audio information transmitted and received are information of only one participant acquiring the light to speak.

In the cases shown in FIGS. 13 and 15, two or more conference participants can speak simultaneously and video image information and audio information of the speakers are transmitted and received.

In the cases shown in FIGS. 14 and 15, the system may also be such that, when the participant A participates in a TV conference, the terminal utilized by the participant A correspondingly requests the right to speak automatically, and the speech of the participant A input through the microphone 106 is transmitted to the other terminals utilized by the participants B and C when the right to speak is acquired, as in the cases shown in FIGS. 12 and 13A.

In the second embodiment, the timing of the display of a still image may be such that the display system is changed when the supply of a video image and audio information related to the image is stopped.

According to the second embodiment, as described above, video image information and audio information are transmitted and received only when at least one conference participant is speaking, and transmitting and receiving are stopped when no participant is speaking. It is therefore possible to reduce the amount of communication data and the processing load upon each terminal as well as to reduce noise during the conference.

The present invention can be modified in other various ways without departing from its spirit and essential features.

For example, the present invention also includes an apparatus arranged by incorporating the second embodiment in the first embodiment.

With respect to the second embodiment, the method of storing a final frame picture of a received video image as a still picture in the picture storage section 113 has been described. However, any frame picture in a received video image other than the final frame picture may alternatively be stored.

In other words, the foregoing description of embodiments has been given for illustrative purposes only and is not to be construed as imposing any limitation in every respect.

The scope of the invention is, therefore, to be determined solely by the following claims and is not limited by the text of the specification and alterations made within a scope equivalent to the scope of the claims fall within the true spirit and scope of the invention.

What is claimed is:

1. A terminal apparatus for holding a TV conference by communicating at least images and voices, comprising:

a zoomable camera, arranged to take a picture to obtain video information;

a plurality of audio input units, arranged to input audio information;

a presetting unit, arranged to preset a zoom ratio of said zoomable camera in correspondence with respective setting positions of each of said plurality of audio input units;

a detector, arranged to detect an audio information input state of each of said plurality of audio input units; and a controller, arranged to adaptively control said zoomable camera in accordance with an output of said detector and an output of said presetting unit, wherein said controller adaptively controls the zoom ratio of said zoomable camera in accordance with a number of audio input units inputting audio information and respective setting positions of each of the audio input units inputting the audio information.

2. An apparatus according to claim 1, wherein said presetting unit stores first picture-taking position information for taking a wide-angle picture and second picture-taking position information for taking a close-up picture, and wherein said controller controls a picture-taking state of said zoomable camera based on at least one of the first and second picture-taking position information.

3. An apparatus according to claim 2, wherein said controller controls the picture-taking state of said zoomable camera based on the first picture-taking position information when the audio information is input to at least two of said plurality of audio input units.

4. An apparatus according to claim 1, further comprising a transmitter, arranged to transmit the video information obtained by said zoomable camera and audio information outputted from at least one of said plurality of audio input units by multiplexing the video information and the outputted audio information.

5. A terminal apparatus according to claim 1, wherein said presetting unit performs a presetting operation before the TV conference.

6. A terminal apparatus according to claim 1, wherein said presetting unit sets a pan and a tilt.

7. A terminal apparatus according to claim 1, wherein said presetting units sets a respective zooming state of each of said plurality of audio input units.

8. A method of using a terminal apparatus for communicating at least images and voices, the terminal apparatus including at least a zoomable camera and a plurality of audio input units, said method comprising the steps of:

taking a picture using the zoomable camera to obtain video information;

inputting audio information using the plurality of audio input units;

presetting a zoom ratio of the zoomable camera in correspondence with a setting position of each of the plurality of audio input units;

detecting an audio information input state of each of the plurality of audio input units; and controlling the zoomable camera using a stored zoom ratio in correspondence with the inputted audio information, wherein said controlling step adaptively controls the zoom ratio of said zoomable camera in accordance with a number of audio input units inputting audio and respective setting position of the audio input units inputting the audio information.

9. A method according to claim 8, wherein said presetting step stores first picture-taking position information for taking a wide-angle picture and second picture-taking position information for taking a close-up picture, and wherein said controlling step controls a picture-taking state of the zoomable camera based on at least one of the first and second picture-taking position information.

10. A method according to claim 9, wherein said controlling step controls the picture-taking state of the zoomable camera based on the first picture-taking position information when the audio information is input to at least two of the plurality of audio input units.

11. A method according to claim 8, further comprising the step of transmitting the video information obtained by the zoomable camera and audio information outputted from at least one of the plurality of audio input units by multiplexing the video information and the outputted audio information.

* * * * *

UNITED STATES PATENT AND TRADEMARK OFFICE
CERTIFICATE OF CORRECTION

PATENT NO.    : 6,219,086 B1
DATED         : April 17, 2001
INVENTOR(S)   : Makoto Murata Page 1 of 1

It is certified that error appears in the above-identified patent and that said Letters Patent is hereby corrected as shown below:

Column 2,
Line 58, "picture taking" should read -- picture-taking --

Column 6,
Line 57, "(participants" should read -- (participant --.

Column 10,
Line 43, "audio" should read -- audio information --.

Signed and Sealed this

Second Day of April, 2002

Attest:

Attesting Officer

JAMES E. ROGAN
Director of the United States Patent and Trademark Office